United States Patent
Kim

(10) Patent No.: US 9,762,444 B1
(45) Date of Patent: Sep. 12, 2017

(54) DETECTING A CONFIGURATION PROFILE FROM A MANAGEMENT AGENT

(71) Applicant: MOBILE IRON, INC., Mountain View, CA (US)

(72) Inventor: Mansu Kim, Cupertino, CA (US)

(73) Assignee: MOBILE IRON, INC., Mountain View, CA (US)

( * ) Notice: Subject to any disclaimer, the term of this patent is extended or adjusted under 35 U.S.C. 154(b) by 200 days.

(21) Appl. No.: 14/563,955

(22) Filed: Dec. 8, 2014

Related U.S. Application Data

(60) Provisional application No. 61/913,037, filed on Dec. 6, 2013.

(51) Int. Cl.
| | | |
|---|---|---|
| *H04L 9/32* | (2006.01) | |
| *H04L 12/24* | (2006.01) | |
| *H04L 29/06* | (2006.01) | |
| *H04L 29/08* | (2006.01) | |

(52) U.S. Cl.
CPC ...... *H04L 41/0866* (2013.01); *H04L 63/0823* (2013.01); *H04L 67/02* (2013.01)

(58) Field of Classification Search
CPC .............. H04L 63/0807; H04L 63/0823; H04L 9/3294; H04L 63/0815; G06F 21/33
USPC ............................................................. 726/10
See application file for complete search history.

(56) References Cited

U.S. PATENT DOCUMENTS

| | | | | |
|---|---|---|---|---|
| 8,910,263 | B1* | 12/2014 | Martini | H04L 63/102 726/26 |
| 2011/0252240 | A1* | 10/2011 | Freedman | H04L 63/02 713/169 |
| 2014/0289510 | A1* | 9/2014 | Tuch | H04L 63/102 713/156 |

* cited by examiner

*Primary Examiner* — Baotran N To
(74) *Attorney, Agent, or Firm* — Van Pelt, Yi & James LLP

(57) ABSTRACT

Detecting a mobile device management (MDM) profile from a management agent is disclosed. A third party management agent is used to perform a test operation to determine an occurrence of an indirect indication of a presence of a configuration profile. The occurrence of the indirect indication is based at least in part on the presence of indirect indication-associated data in the configuration profile. It is determined, based at least in part on the occurrence of the indirect indication, that the configuration profile is implemented by a platform management agent.

21 Claims, 11 Drawing Sheets

DETECTING A CONFIGURATION PROFILE FROM A MANAGEMENT AGENT

CROSS REFERENCE TO OTHER APPLICATIONS

This application claims priority to U.S. Provisional Patent Application No. 61/913,037, entitled DETECTING MDM PROFILE FROM MANAGEMENT AGENT filed Dec. 6, 2013 which is incorporated herein by reference for all purposes.

BACKGROUND OF THE INVENTION

Many mobile device management (MDM) frameworks include a platform management agent. The platform management agent may be associated with the operating system of the device. A platform management agent may be configured based on a configuration profile (e.g., an MDM configuration profile). In certain cases, an enterprise may manage a device by implementing MDM protocols that interface with the configuration profile. For example, a third party MDM solution vendor may install a third party management agent app on the device. To evaluate the security state of the mobile device and perform other operations, the third party management agent may seek to determine whether the configuration profile exists on the device. In certain cases, however, there may be no efficient way for the third party management agent to detect whether a configuration profile is deployed to the device without involving a device management server and/or other nodes.

BRIEF DESCRIPTION OF THE DRAWINGS

Various embodiments of the invention are disclosed in the following detailed description and the accompanying drawings.

DETAILED DESCRIPTION

Figure 1:
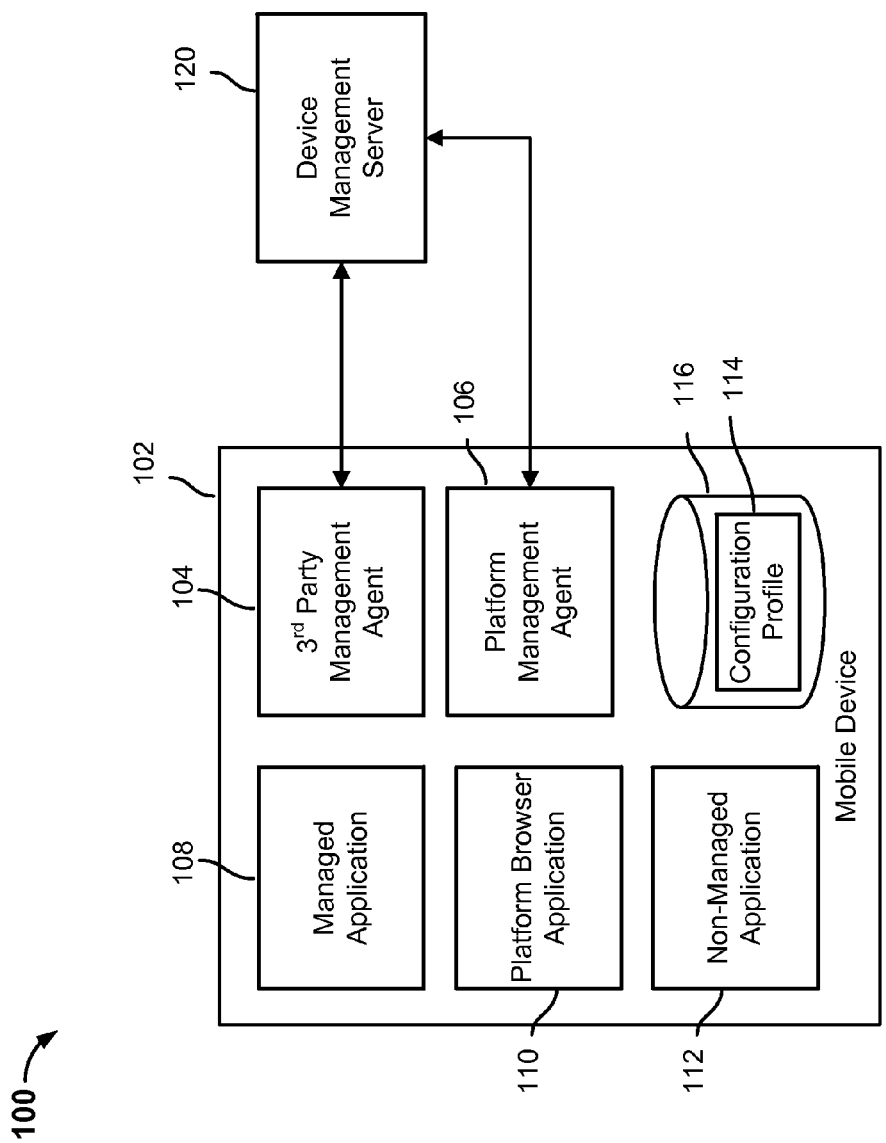
FIG. 1 is a block diagram illustrating embodiments of a system to provide an MDM configuration profile to a mobile device.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Detecting a mobile device management (MDM) profile from a management agent is disclosed. The techniques disclosed herein allow a third party management agent to detect whether a configuration profile (e.g., an MDM configuration profile) provided to a platform management is present on a device. In certain systems, a third party management server provides a configuration profile to a platform management agent that is associated with (e.g., embedded in) the operating system of the device. The configuration profile may include, for example, security configuration information (e.g., encryption, password complexity, and/or other security settings), email configuration information, Wi-Fi configuration information, and/or other configuration information. The platform may implement the configuration profile to manage and secure the device. To determine the management and security state of the device, the third party management agent may need to periodically check whether the configuration profile is currently implemented by the platform management and/or has been removed from the device. In certain systems, however, there may be no direct way (such as an application programming interface (API)) for the third party management agent to determine whether the configuration profile is present on the device and/or is currently implemented by the platform management agent. Certain systems may not provide this functionality (e.g., a direct configuration profile detection mechanism) in order to prevent malicious users from accessing a device configuration profile and exploiting the information included therein (e.g., by faking the behavior of the device configuration profile as applied to the device). The techniques disclosed herein allow a third party management agent to indirectly detect the presence of a configuration profile on the device and/or determine whether the configuration profile is implemented and/or enforced by the platform management agent.

A third party management agent is used to perform a test operation to determine an occurrence of an indirect indication of a presence of a configuration profile. The occurrence of the indirect indication is based at least in part on the presence of indirect indication-associated data in the configuration profile. It is determined, based at least in part on the occurrence of the indirect indication, that the configuration profile is implemented by a platform management agent.

FIG. 1 is a block diagram illustrating embodiments of a system to provide an MDM configuration profile to a mobile device. In the example shown, a system 100 includes a device 102, a device management server 120, and/or other components. A device 102 may include a smartphone, tablet, desktop computer, laptop, and/or any other computing device. The device 102 may include any device that supports MDM protocols and/or is configurable for operation in an MDM system. A mobile device 102 may include a third party management agent 104, a platform management agent 106, managed application(s) 108, a platform browser application 110, non-managed application(s) 112, and/or other components. The third party management agent 104 (e.g., enterprise management agent, non-native management agent) may include a management agent installed on the device 102 by a third party MDM provider. The MDM provider may, for example, be an entity that is separate from the mobile device operating system developer and/or mobile device developer. The MDM provider may be associated with the device management server 120, and the third party management agent 104 may be controlled by and/or perform operations on behalf of the device management server 120. The third party management agent 104 may be configured to, for example, monitor the security of the device, configure one or more managed applications 108, and/or perform other operations. A platform management agent 106 (e.g., a native management agent) includes a management agent associated with the operating system (OS) of the device 102 (such as iOS). The platform management agent 106 may be embedded in the OS of the device 102. The platform management agent 106 may manage various aspects of the mobile device 102 including the security of the device 102, wireless configurations of the device 102, email configurations of the device 102, managed application configurations, and/or other aspects of the device 102.

In various embodiments, a configuration profile 114 is provisioned to the platform management agent 106. The configuration profile 114 may include an MDM configuration profile, a platform MDM configuration profile, a native MDM configuration profile, etc. The configuration profile 114 may be stored in storage 116 on the device 102. The platform management agent 106 manages various aspects of the device 102 operation based on the configuration profile 114. In some cases, a configuration profile 114 may include a single profile including, for example, security configuration information (e.g., password policies, encryption rules, etc.), certificate configuration information (e.g., certificate authority (CA) certificates, server certificates, client certificates, and/or other certificates associated with enterprise resources/servers), wireless configuration information (e.g., Wi-Fi network configurations, Bluetooth network configurations), email configuration information (e.g., enterprise email configurations), virtual private network (VPN) configuration information, managed application configuration information, and/or other configuration information. In certain cases, a configuration profile 114 includes one or more sub-profiles within a single configuration profile. In one example, a configuration profile 114 may include a security configuration profile including password policies (such as password length and/or complexity requirements, password recovery rules, etc.), data security policies (such as encryption rules, etc.), and/or other security-related configuration information. In another example, a configuration profile 114 includes a wireless configuration profile including Wi-Fi configuration information (such as trusted Wi-Fi networks, Wi-Fi service set identifiers (SSID) for trusted Wi-Fi networks, etc.), Bluetooth configuration information, and/or other wireless configuration information. In a further example, a configuration profile 114 includes an email configuration profile including email configuration information for one or more email accounts associated with the user of the device. In another example, a configuration profile 114 includes a VPN profile including, for example, VPN client configuration information, VPN server address(es), and/or other information. In a further example, a configuration profile 114 includes a managed application configuration profile. The managed application configuration profile may be used to configure settings associated with one or more managed applications 108 on the device.

In various embodiments, the device management server 120 provides the configuration profile 114 to the platform management agent 106. In certain cases, the platform management agent 106 is not configured to directly seek out and install a configuration profile 114. In this case, the third party management agent 104 causes the platform management agent 106 to enroll with the device management server 120 and/or retrieve the configuration profile from the device management server 120. In some embodiments, upon initial configuration of the mobile device 102 for operation with a third party provided MDM system, the third party management agent 104 is installed on the device 102. The third party management agent 104 may cause the platform management agent 106 to register with the device management server 120. For example, the third party management agent 104 may generate a uniform resource locator (URL) scheme including a file that directs the platform management agent 106 to enroll with the device management server 120. The URL scheme may include, for example, a URL associated with the device management server 120 such as "http://DeviceMgmtServer/ABCD/mdm.mobileconfig." The third party management agent 104 may call the URL, and as a result a platform browser application 110 on the device may be invoked to access the URL ("http://DeviceMgmtServer/ABCD/mdm.mobileconfig") and download a file from the device management server 120. The file, an mdm.mobileconfig file, may include an extensible markup language (XML) file including, for example, Simple Certificate Enrollment Protocol (SCEP) information, an address of the device management server 120 (e.g., internet protocol (IP) address of the management server 120), server identification information, and/or other information. Upon retrieving the file from the device management server 120, the platform browser application 110 may be determined based on a file extension of the file, the Multipurpose Internet Mail Extension (MIME) type associated with the file, and/or other information that the file is to be provided to the platform management agent 106. The platform management agent 106 uses information included in the file, such as the device management server address, to access the device management server 120. The platform management agent 106 may contact the device management server 120 to enroll with the device management server 120. The platform management agent 106 may, for example, download a configuration profile 114, certificates, and/or other information. The platform management agent 106 may apply the configuration profile 114 and/or manage various aspects of the device operation according the configuration profile 114. For example, a security profile included in the configuration profile 114 may be used to configure the security settings of the device, such as password complexity requirements, data encryption settings, and/or other security-related settings. In another example, a certificate profile may include client certificates, server certificates, CA certificates, and/or other certificates usable by the OS and/or platform management agent 106 to establish trust and/or authenticate with enterprise servers and/or resources. In a further example, a wireless configuration profile is used to configure one or more trusted Wi-Fi networks (e.g., Wi-Fi SSIDs) on the device. In another example, the platform management agent 106 uses a managed application configuration to configure settings associated with one or more managed applications 108 on the device 102.

According to some embodiments, once the configuration profile 114 is installed by the platform management agent 106, a settings menu/interface of the mobile device 102 may display the configuration profile 114. A user of the device 102 may, for example, access the settings on the mobile device 102 by clicking on a settings icon. The configuration profile 114 and/or one or more sub-profiles may be listed in a settings menu display. For example, the settings menu display may include an MDM configuration profile, a WiFi configuration profile, a security profile, and/or other profiles. In certain cases, a user is able to delete, deactivate, and/or remove a configuration profile 114 from the settings menu and/or other interface. As discussed below, in certain cases the third party management agent 104 may not be able to directly detect that the user has removed a configuration profile 114.

In various embodiments, the third party management agent 104 monitors the security state of the device 102 and/or performs other management operations. As part of the monitoring process and/or other management processes, the third party management agent 104 may need to determine whether the configuration profile 114 is installed on the device and/or is being applied to the device 102 by the platform management agent 106. In certain cases, however, the third party management agent 104 is not able to directly monitor, detect, and/or determine whether the configuration profile 114 is installed on the device. The third party management agent 104 may not be able to directly detect whether the platform management agent 106 has applied and/or is continuing to apply the configuration profile 114 to management of the device 102. In certain systems such as a mobile device including the iOS, Windows, and/or other operating system, there may not be a direct way for a third party management agent 104 to query a configuration profile 114 applied to the device by the platform management agent 106. For example, operating systems such as iOS, Windows, and/or other systems, do not provide an application programming interface (API) and/or any other mechanism that allows a third party management agent 104 to directly query configuration settings of the device. The techniques disclosed herein in various embodiments allow a third party management agent 104 to indirectly determine whether a configuration profile 114 is installed on the device, is being applied to the device 102 by a platform management agent 106, and/or is otherwise present on the device.

Figure 2:
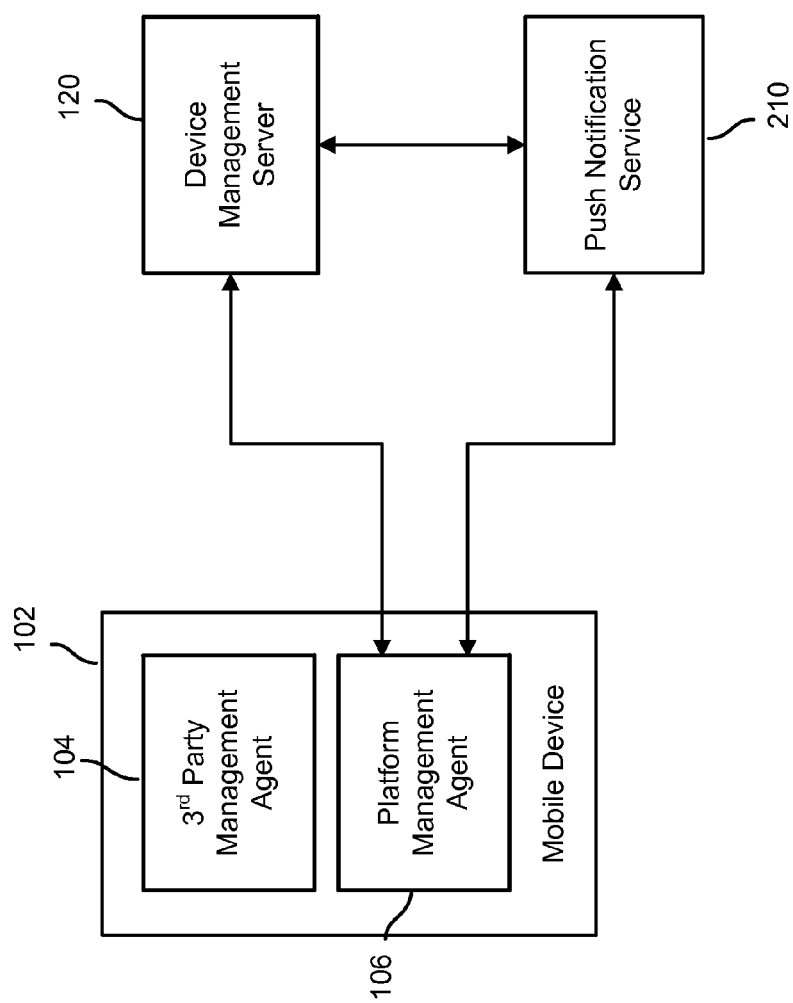
FIG. 2 is a block diagram illustrating embodiments of a system to detect whether a configuration profile is applied to a device.

FIG. 2 is a block diagram illustrating embodiments of a system to detect whether a configuration profile is applied to a device. In the example shown, a device management server 120 communicates with a platform management agent 106 via a push notification service 210 (e.g., Apple Push Notification (APN) service) to determine state information and/or other information associated with the platform management agent 106. In various embodiments, a platform management agent 106 provides a push notification token to the device management server 120 during registration. For example, in a registration process (as discussed above), the platform management agent 106 may download a configuration profile and/or other information from the device management server 120. The platform management agent 106 may also provide a push notification token to the device management server 120 during the registration process. In some embodiments, the device management server 120 uses the platform management agent push token to send a push notification to the platform management agent 106. In one example, a push notification may include a request for the platform management agent 106 to report its current state to the device management server 120. The push notification is provided to the push notification service 210 along with the push notification token. The push notification service 210 provides the push notification to the platform management agent 106. In response to the push notification requesting a current state of the platform management engine, the platform management agent 106 checks in with the device management server 120. For example, the platform management engine 106 may provide its status (e.g., active), information indicating whether the configuration profile is installed, and/or other information to the device management server.

In certain cases, this technique of determining a status of a platform management agent 106 and/or determining whether the configuration profile is applied to the device may be ineffective. This forced check-in approach may, for example, be unsuccessful if the device is offline. The approach may also be less effective if network issues limit and/or block communication with the device. The approach may be limited if a firewall(s) is in place between device 102, push notification service 210, and/or device management server 120. In addition, the platform management agent 106 check-in may not be performed using a guaranteed protocol, so the device may potentially falsely detect and report that the configuration profile does not exist.

Figure 3:
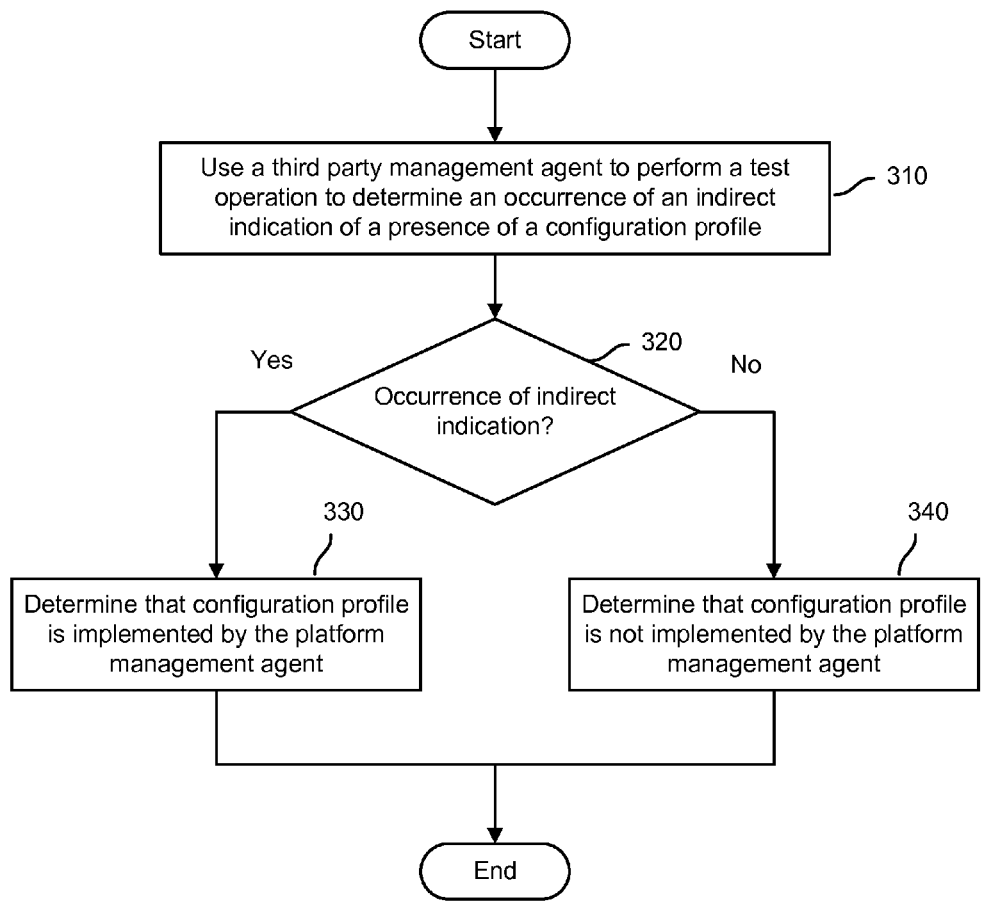
FIG. 3 is a flowchart illustrating embodiments of a process to determine that a configuration profile is provisioned to a platform management agent.

FIG. 3 is a flowchart illustrating embodiments of a process to determine that a configuration profile is provisioned to a platform management agent. In various embodiments, the process of FIG. 3 may be implemented by a third party management agent on a device, such as third party management agent 104 of FIG. 1. In the example shown, a third party management agent is used (310) to perform a test operation to determine an occurrence of an indirect indication of a presence of a configuration profile. The occurrence of the indirect indication may be based at least in part on the presence of indirect indication-associated data in the configuration profile. Similarly, the absence of occurrence of the indirect indication may be based on the absence of indication-associated data on the mobile device. It is determined (320) whether the indirect indication has occurred. In the event it is determined that the indirect indication has occurred, the process proceeds to step 330, and it is determined (330) that the configuration profile is implemented by the platform management agent. In the event it is determined that the indirect indication has not occurred, the process proceeds to step 340. It is determined (340) that the configuration profile is not implemented by the platform management agent.

In some embodiments, a third party management agent performs a test operation based on certificate trust. The third party management agent may receive a certificate (such as a server certificate, a CA certificate, and/or other certificate) from a device management server. The certificate may be associated with a certificate included in a configuration profile previously provisioned to the platform management agent. For example, the certificate received by the third party management agent may have been issued by a same certificate authority (e.g., a CA associated with the device management platform) as the certificate included in the configuration profile previously provisioned to the platform management agent. The certificate included in the configuration profile may include and/or be referred to as indirect indication-associated data. The third party management agent may use the received certificate to generate a server on the mobile device. The server may include, for example, a web server, a hypertext transfer protocol secure (HTTPS) web server, and the certificate may be used to establish a secure sockets layer (SSL), transport layer security (TLS), and/or other secure connection between the web server and various nodes. To test for the presence of a certificate in a configuration profile provisioned to the platform management agent, the third party management agent may generate a web request and/or other call to the server using a platform-supported operation. The platform (e.g., OS) may execute the web request and attempt to establish a trusted connection with the web server.

In the event the certificate included in the configuration profile is present on the device and/or accessible to the operating system of the device, the platform will trust the certificate of the web server and the web request and/or call may be successful. The platform may trust the certificate because it is provided by a same CA as the certificate included in the configuration profile on the device. The successful authentication may include an occurrence of an indirect indication that the configuration profile is present on the device. Similarly, the indication that the certificate is included in the configuration profile present on the device may include an occurrence of an indirect indication that the configuration profile is present on the device. Based on the occurrence of the indirect indication, it is determined that the configuration profile is implemented by the platform management agent.

In the event the certificate included in the configuration profile is not present on the device and/or accessible to the operating system of the device, the platform will not trust the certificate of the web server and the web request and/or call may be unsuccessful. The platform may not trust the certificate of the web server because it does not have a certificate from the same certificate authority. The unsuccessful authentication to the web server may include an absence of an occurrence of an indirect indication that the configuration profile is present on the device. Based on the absence of occurrence of the indirect indication, it is determined that the configuration profile is not implemented by the platform management agent.

In various embodiments, a third party management agent performs a test operation using wireless configuration information. The third party management agent may receive wireless configuration information from the device management server. The wireless configuration information may include a Wi-Fi network configuration information, BlueTooth configuration information, and/or other type of wireless configuration information. The wireless configuration information received at the third party management agent may be associated with wireless configuration information included in a wireless configuration profile previously provisioned to the platform management agent. The wireless configuration information included in a wireless configuration profile may include indirect-indication associated data. For example, a Wi-Fi configuration (e.g., Wi-Fi SSID and login credentials) received at the third party management agent may be the same as a Wi-Fi configuration included in the configuration profile previously provisioned to the platform management agent. The third party management agent may use the wireless configuration information to query wireless configuration settings of the mobile device. For example, the third party management agent may determine whether a Wi-Fi configuration (e.g., Wi-Fi SSID) received from the device management server matches any of the device's trusted Wi-Fi networks. In the event that the received Wi-Fi configuration matches a device trusted Wi-Fi network, it may indicate the wireless configuration profile previously provisioned to the platform management agent is present on the device. A determined match between the received Wi-Fi configuration information and a trusted Wi-Fi network may include an occurrence of an indirect indication that the configuration profile is present on the device. Based on the occurrence of the indirect indication, it is determined that the configuration profile is implemented by the platform management agent.

In the event the received Wi-Fi configuration does not match a trusted Wi-Fi network, it may indicate that the wireless configuration profile previously provisioned to the platform management agent is not present on the device. Based on the absence of occurrence of the indirect indication (a match between the Wi-Fi configuration and a trusted Wi-Fi SSID), it is determined that the configuration profile is not implemented by the platform management agent.

In some embodiments, a third party management agent performs a test operation using managed application configuration information. The device management server may generate a managed application configuration profile. The managed application profile may be generated to include indirect indication-associated data. The indirect indication-associated data may include a configuration parameter for a managed application, a particular setting for a managed application, and/or other configuration parameters. In one example, indirect indication-associated data includes a configuration parameter for a managed application including the parameter "MDM=True." The platform management agent may download the managed application configuration profile including the configuration parameter, and the platform management agent applies that configuration parameter to the settings for the application. To indirectly detect the presence of the configuration profile, the third party management agent may perform a test operation to query the settings for that application. In the event the third party management agent detects a configuration parameter (e.g., "MDM=True") and/or other information in the settings of the application, it may indicate the application management profile and/or associated configuration profile previously provisioned to the platform management agent is present on the device. The detection of the configuration parameter (e.g., "MDM=True") in the settings of the application may include an occurrence of an indirect indication that the configuration profile is present on the device. Based on the occurrence of the indirect indication, it is determined that the configuration profile is implemented by the platform management agent.

In the event the third party management agent does not detect a configuration parameter (e.g., "MDM=True") and/or other information in the settings of the application, it may indicate that the managed application configuration profile previously provisioned to the platform management agent is not present on the device. Based on the absence of occurrence of the indirect indication (e.g., detection of a configuration parameter), it is determined that the configuration profile is not implemented by the platform management agent.

Figure 4:
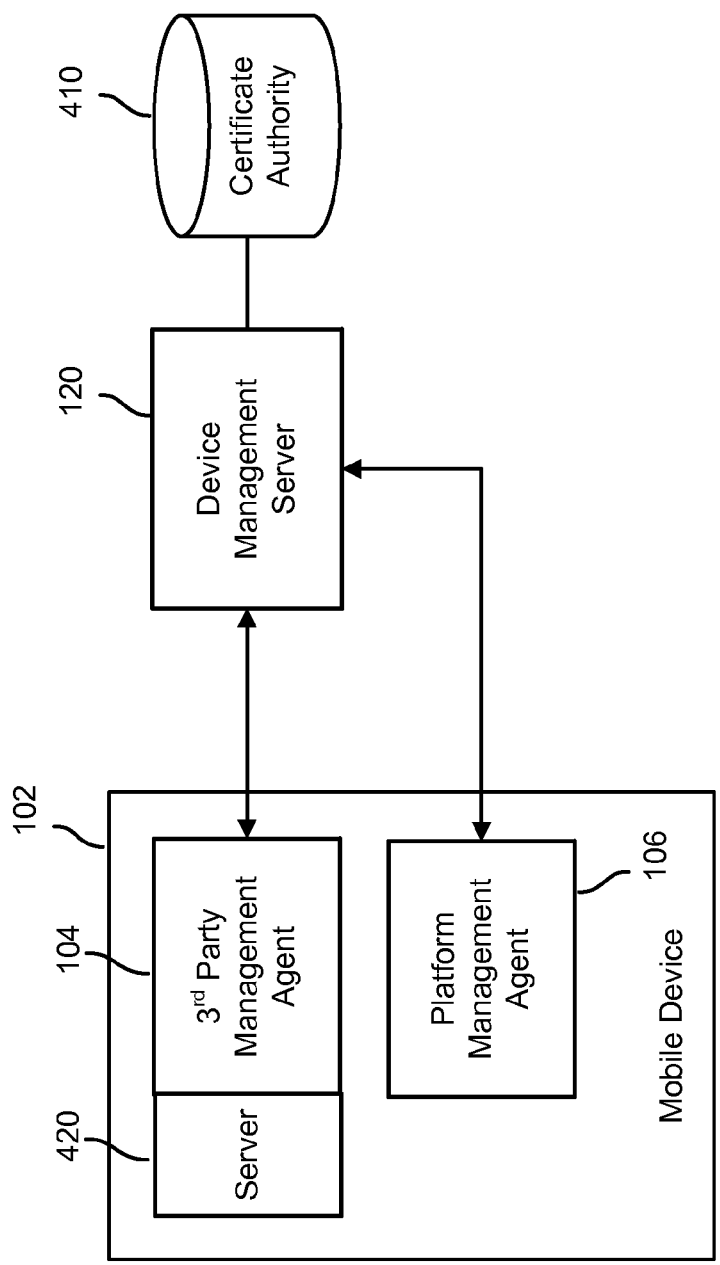
FIG. 4 is a block diagram illustrating embodiments of a system to determine that a configuration profile is provisioned to a platform management agent.

FIG. 4 is a block diagram illustrating embodiments of a system to determine that a configuration profile is provisioned to a platform management agent. In the example shown, a device management server 120 generates a configuration profile. The configuration profile may include multiple profiles including a certificate profile and/or any other profiles (e.g., security configuration profile, etc.). The certificate profile may include server certificate(s), CA certificate(s), a CA certificate chain, and/or other certificates. In certain cases, server certificates, CA certificates, and/or other certificates may be associated with enterprise resources (e.g., enterprise servers, services, etc.). The server certificates, CA certificates, and/or other certificates may be used by the mobile device to determine the authenticity of various enterprise resources. In some embodiments, at least one certificate in the certificate profile includes indirect indication-associated data. The at least one certificate (e.g., indirect indication-associated data) may be included in the certificate profile for the purpose of determining whether the certificate profile exists on the mobile device. The certificate may include data that is used to trace and/or determine the presence of the certificate profile and/or an associated configuration profile. One or more of the certificates may be generated using a certificate authority 410 associated with the device management server. The certificate authority 410 may include an on-board certificate authority at the device management server 120. In one example, the certificate profile generated by the device management server 120 includes a CA certificate chain associated with the certificate authority 410. In certain cases, the certificate profile is merged with one or more profiles (e.g., security configuration profile, Wi-Fi profile, etc.) to generate a single configuration profile. The configuration profile is provided to the platform management agent during a registration process as discussed above.

In various embodiments, a certificate (e.g., separate from the certificate profile) is generated and provided to the third party management agent 104. The certificate may be generated using the certificate authority 410 associated with the device management server 120. As a result, the certificate may be associated with indirect indication-associated data including a server certificate, CA certificate, CA certificate chain, and/or other certificate information included in the certificate profile provisioned to the platform management agent 106. In some cases, the certificate is provided to the third party management agent 104 at a time after the platform management agent 106 registers with the device management server 120 and/or receives the configuration profile. The certificate provided to the third party management agent 104 is used to determine whether the configuration profile previously provided to the platform management agent 106 exists on the device. In various embodiments, the third party management agent 104 uses the certificate to generate a server 420 on the mobile device 102. The server 420 may include, for example, a web server, a hypertext transfer protocol secure (HTTPS) web server. The received certificate may be used to establish a secure sockets layer (SSL), transport layer security (TLS), and/or other secure connection between the server 420 and various nodes, such as other applications on the device 102, the device operating system, and/or other nodes. The third party management agent 104 may generate a web request and/or other call to the server 420 using a platform-supported operation. The platform (e.g., OS) may execute the web request and/or other call and attempt to establish a trusted connection with the server 420.

In the event that the certificate profile previously provisioned to the platform management agent is present on the device, the platform may access the CA certificate chain (e.g., indirect indication-associated data) associated with the certificate authority 410 and/or another certificate issued by the certificate authority 410. Based on the CA certificate chain associated with the certificate authority 410 and/or other certificate issued by the certificate authority 410, the platform may determine that the certificate used to generate server 420 is trustworthy. In this case, the platform may successfully authenticate with the server 420. The successful authentication by the platform with the server 420 may indicate that the configuration profile exists on the mobile device.

In the event the certificate profile previously provisioned to the platform management agent is not present on the device (e.g., has been removed, tampered with, etc.), the platform may have no basis to determine that the certificate used to generate the server 420 and/or the server 420 itself is trustworthy. In this case, the authentication may be unsuccessful and/or may fail. The failed authentication to the server 420 may be detected by the third party management agent 104, and based on the detection it may be determined that the configuration profile is not currently implemented by the platform management agent 106.

Figure 5:
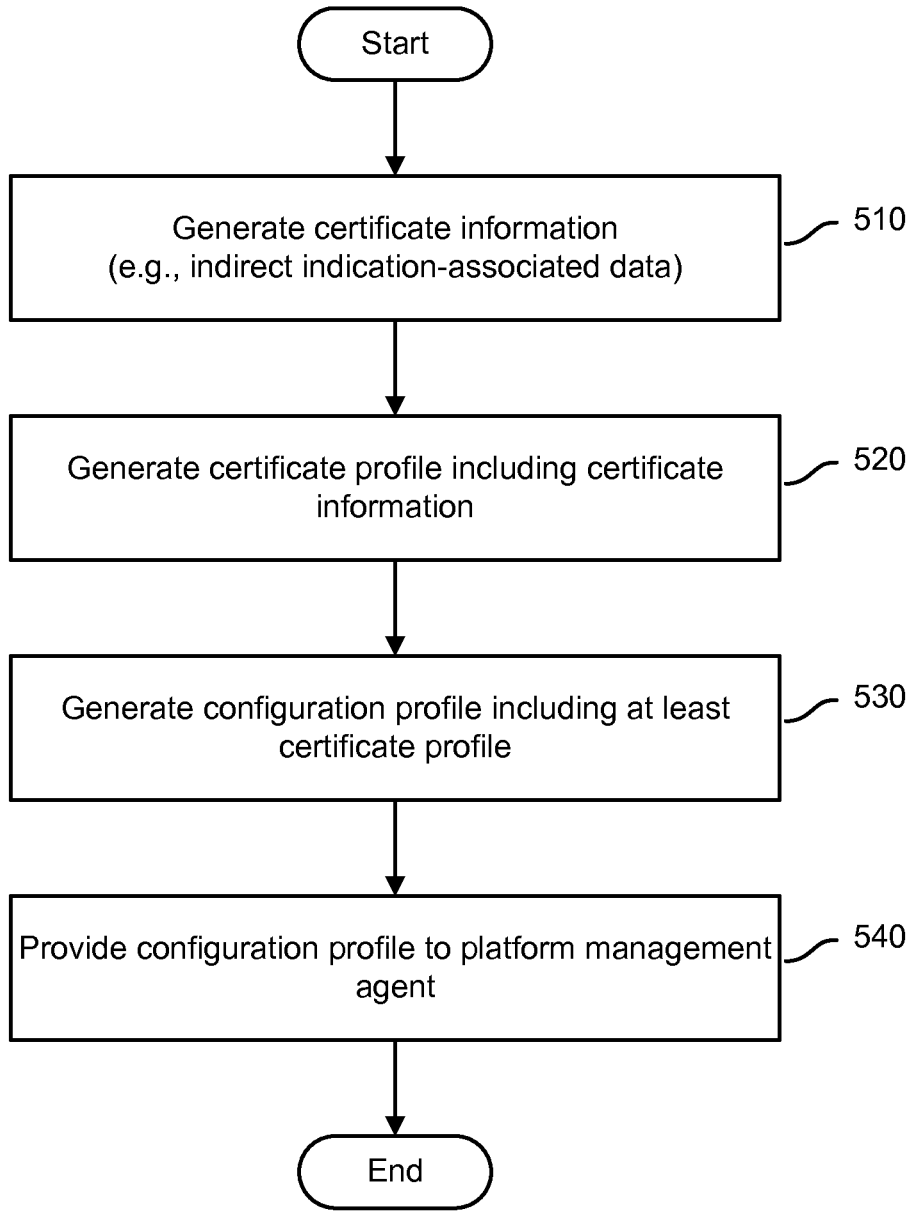
FIG. 5 is a flowchart illustrating embodiments of a process to provide a configuration profile to a platform management agent.

FIG. 5 is a flowchart illustrating embodiments of a process to provide a configuration profile to a platform management agent. In various embodiments, the process of FIG. 5 may be performed at a device management server, such as device management server 120 of FIG. 4. In the example shown, certificate information is generated (510). Certificate information may include, for example, a server certificate, CA certificate, CA certificate chain, and/or other certificate information. The certificate information may be generated by and/or issued by a certificate authority associated with the device management server. The certificate information may include indirect indication-associated data. In one example, indirect indication-associated data includes a CA certificate chain associated with the certificate authority. As discussed below, the CA certificate chain may be used to authenticate the platform with a server generated by the third party management agent using a certificate generated by the same CA. In some cases, the indirect indication-associated data may include a certificate uniquely generated and/or customized for the purpose of determining the presence of a configuration profile on the device. In one example, the indirect indication-associated data may include a server certificate usable to authenticate to a server (e.g., an HTTPS web server) generated by the third party management agent using a certificate sent to the third party management agent.

In some embodiments, a device management server may be associated with multiple CAs. In one example, the indirect indication-associated data may include a certificate generated by a specific CA selected from one of multiple CAs associated with the device management server. For example, the indirect indication-associated data may be updated periodically and a new configuration profile generated using the techniques discussed herein. In certain cases, each time indirect indication-associated data is updated, a different CA may be used. Using different CAs to periodically update indirect indication-associated data may make it more difficult for a malicious user to circumvent the configuration profile removal detection techniques disclosed herein. For example, it may be more difficult for a malicious user to transfer a certificate from a first device to a second device to circumvent the configuration profile detection techniques disclosed herein.

A certificate profile is generated (520) including the certificate information. A certificate profile is generated including the indirect indication-associated data, such as a server certificate, a CA certificate, a CA certificate chain, and/or other certificate information. The certificate profile may also include certificates associated with enterprise servers, enterprise services, and/or other resources.

A configuration profile is generated (530) that includes at least the certificate profile. In various embodiments, a certificate profile is merged with one or more other profiles to generate a configuration profile (e.g., an MDM configuration profile). For example, the configuration profile may be merged with a security configuration profile, a VPN configuration profile, a managed application configuration profile, and/or other profiles to generate a single configuration profile. In certain cases, a single configuration profile is generated so that if a user attempts to delete a portion of the configuration profile, such as the security configuration profile, the entire configuration profile including the certificate profile including the indirect indication-associated data will be removed and/or deleted. As a result, the removal and/or deactivation of the configuration profile may be detected using the techniques disclosed herein.

The configuration profile is provided (540) to the platform management agent. In various embodiments, the configuration profile is provided to the platform management agent as part of a registration operation (e.g., as discussed in FIG. 1). In some embodiments, a new configuration profile is generated and provided to the platform management agent after an initial registration. A new configuration profile may be generated and provided to the platform management agent upon the occurrence of certain events, such as changes to security policies applicable to the device, changes in network settings, and/or any other events. In one example, a new certificate profile including updated indirect-indication associated data (e.g., a certificate from a different CA than a previous certificate) may be generated periodically, in response to an event, etc. The new certificate profile may be merged to an updated configuration profile and provided to the device.

Figure 6:
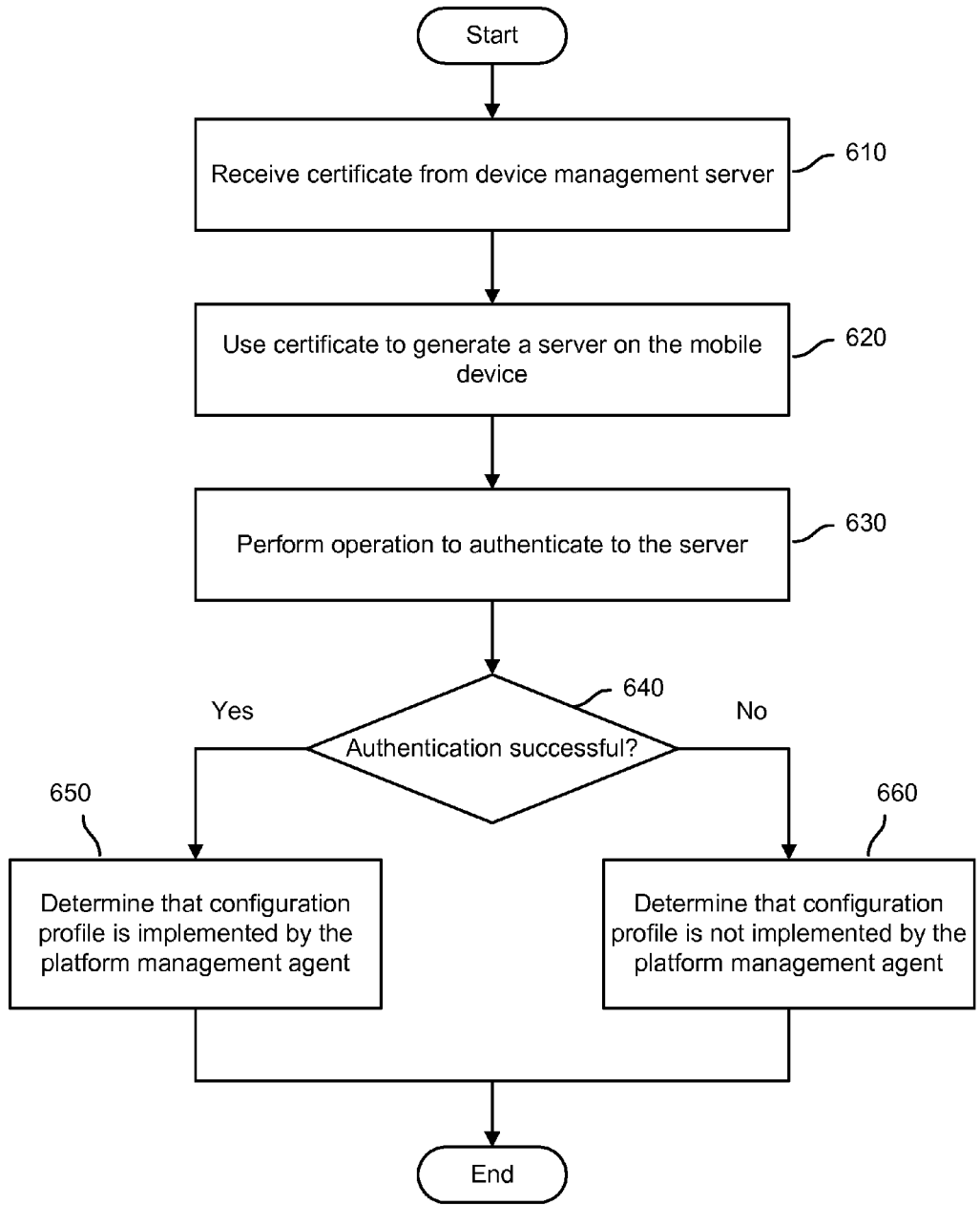
FIG. 6 is a flowchart illustrating embodiments of a process to determine that a configuration profile is implemented by a platform management agent.

FIG. 6 is a flowchart illustrating embodiments of a process to determine that a configuration profile is implemented by a platform management agent. In various embodiments, the process of FIG. 6 is implemented on a mobile device, such as mobile device 102 of FIG. 4. In the example shown, a certificate is received (610) from a device management server. In various embodiments, the certificate received from the device management server is associated with certificate information (e.g., indirect indication-associated information) included in a certificate profile provisioned to the platform management agent. The certificate received at the third party management agent may include a certificate that will be trusted by the mobile device if the certificate profile is applicable to the device (e.g., has not been removed). In certain cases, the certificate received at the third party management agent may include a certificate generated by a certificate authority that generated the certificate information included in the certificate profile. In one example, the certificate received at the third party management agent may include a server certificate (e.g., CA1.Cert1) generated by a certificate authority (e.g., CA1). And the configuration profile provisioned to the platform management agent may include a CA certificate for the same certificated authority (e.g., CA1).

The certificate is used (620) to generate a server on the mobile device. In various embodiments, the third party management agent uses the certificate to generate a web server on the mobile device. For example, the certificate may be used to generate an HTTPS server on the mobile device. The certificate may be used to establish a secure sockets layer (SSL), transport layer security (TLS), and/or other secure connection between the web server and various nodes such as other applications on the device, the device operating system, and/or other nodes. In certain cases, the HTTPS server may include a server with data hosting capabilities, and various nodes may be able to communicate with the server by, for example, authenticating with the server, sending requests to the server, and/or performing other operations. The server may be associated with an address on the device, such as a URL, IP address, and/or other address information.

An operation is performed (630) to authenticate to the server. In various embodiments, a certificate trust validating operation is performed. A certificate trust validation operation may be performed to validate the certificate associated with the server to the platform of the mobile device. In various embodiments, the third party management agent generates a web request and/or call to the HTTPS server generated by the third party management agent. For example, a web request may be generated including a URL of the third party management agent generated server. The web request may include, for example, a request to receive data from the server, a request to connect to the server, and/or any other type of request. The web request may be executed by the platform and/or in conjunction with the device platform. As part of the web request, the platform may establish trust (e.g., SSL trust, certificate trust) with the HTTPS server. In one example, the platform may establish a trusted SSL connection with the HTTPS server. To establish a trusted connection, the platform may validate the authenticity of the certificate used to establish the HTTPS server. In certain cases, the platform may access certificates stored on the device to determine the authenticity of the HTTPS server certificate. In the event that the certificate profile provided to the platform management engine is present on the device, the platform may access the certificate information included in the certificate profile. As discussed above, certificate information included in the certificate profile may include a server certificate, CA certificate, CA certificate chain, and/or other certificate information that is associated with the certificate used to generate the HTTPS server. For example, the certificate information included in the certificate profile may include a CA certificate issued by the CA (e.g., CA1) that also issued the certificate (e.g., CA1.cert1) sent to the third party agent. In the event the certificate profile including the CA certificate is present on the device (e.g., has not been removed), the platform may be configured to trust certificates issued by the CA (e.g., CA1). In this case, the platform would validate the authenticity of the HTTPS server certificate (e.g., CA1.cert1) and successfully authenticate to the HTTPS server. A successful authentication to the server may indicate that the certificate associated with the server has been successfully validated to the platform of the mobile device.

In the event the certificate profile previously provisioned to the platform management agent is not present on the device (e.g., has been removed, tampered with, etc.), the platform may have no basis to determine that the certificate used to generate the HTTPS server and/or the HTTPS server itself is trustworthy. In this case, the authentication may be unsuccessful and/or may fail. The failed authentication to the server may be detected by the third party management agent.

It is determined (640) whether the authentication to the server is successful. In the event the third party management agent and/or platform successfully authenticates to the server, the process proceeds to step 650. In the event the third party management agent and/or platform fails to authenticate to the server, the process proceeds to step 660.

It is determined (650) that the configuration profile is implemented by the platform management agent. In various embodiments, it is determined based on the successful authentication to the server that the configuration profile is implemented by the management agent. In some embodiments, an indication that the platform has successfully authenticated to the HTTPS server may indicate that the platform has validated the authenticity of the certificate used to generate the HTTPS server. The platform may validate the authenticity of the certificate using certificate information (e.g., a server certificate, CA certificate, etc.) included in the certificate profile provided to the platform management agent. In certain cases, the certificate information included in the certificate profile may be the only information usable to authenticate the HTTPS server certificate. For example, the certificate information may include a server certificate (e.g., CA1.cert1) and/or CA certificate that is uniquely associated with the certificate provided to the third party management agent and used to generate the HTTPS server. Consequently, a successful certificate trust validation operation may indicate that the certificate profile is present on the device. Similarly, an indication that the platform has successfully authenticated to the server may indicate that the certificate profile is present on the device. The presence of the certificate profile may indicate that the configuration profile, which includes the certificate profile, is implemented by the platform management agent. The presence of the certificate profile may also indicate that the configuration profile has not been removed (e.g., by a user of the device).

It is determined (660) that the configuration profile is not implemented by the platform management agent. In various embodiments, it is determined based on a failed attempt to authenticate to the server that the configuration profile is not implemented and/or is no longer implemented by the management agent. In some embodiments, an indication that the platform has failed to authenticate the HTTPS server may indicate that the platform is unable to validate the authenticity of the certificate used to generate the HTTPS server. The fact that the platform is unable to validate the authenticity of the certificate used to generate the HTTPS server may indicate that the platform does not have access to the certificate profile including certificate information usable to authenticate the certificate. In this case, it may be determined that the certificate profile and/or the configuration profile including the certificate profile has been removed from the device, tampered with, altered, and/or otherwise modified. The absence of the certificate profile may indicate that the configuration profile is not implemented and/or is no longer implemented by the platform management agent.

Figure 7:
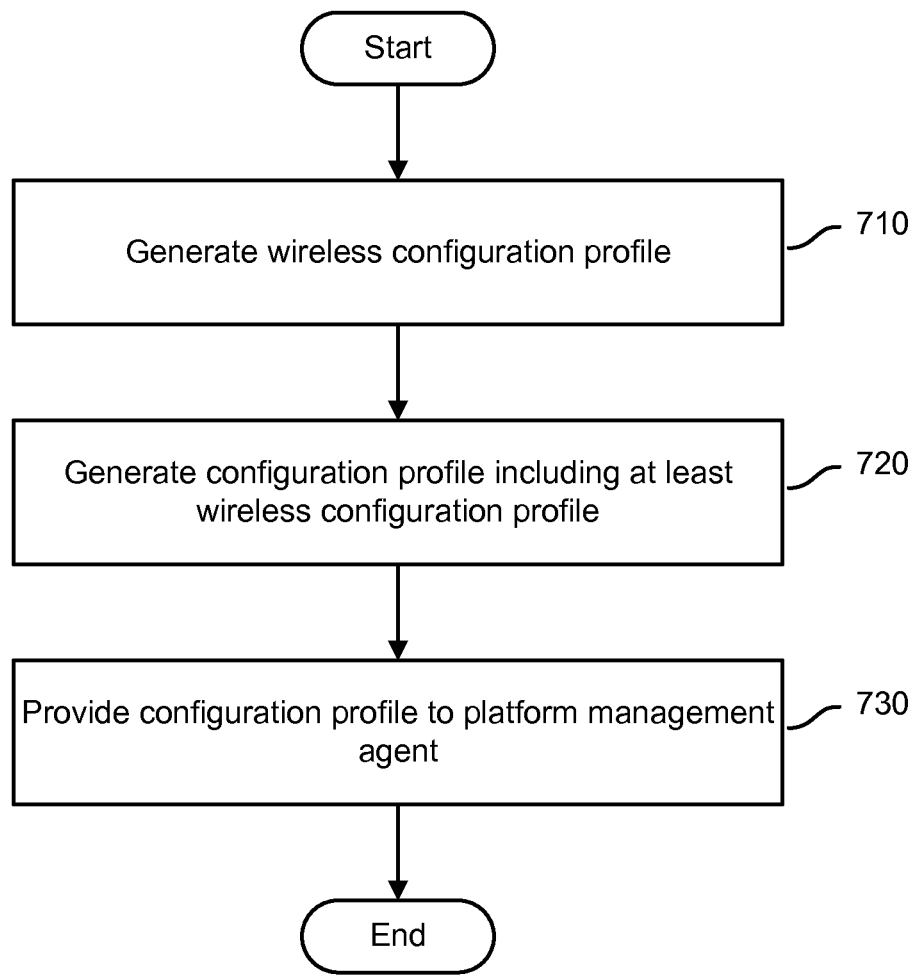
FIG. 7 is a flowchart illustrating embodiments of a process to provide a configuration profile to a platform management agent.

FIG. 7 is a flowchart illustrating embodiments of a process to provide a configuration profile to a platform management agent. In various embodiments, the process of FIG. 7 may be performed at a device management server, such as device management server 120 of FIG. 1. In the example shown, a wireless configuration profile is generated (710). In various embodiments, a device management server generates a wireless configuration profile. The wireless configuration profile may include wireless configuration information, such as Wi-Fi configuration information, Bluetooth configuration information, and/or any other wireless configuration information. The wireless configuration information included in a wireless configuration profile may include indirect-indication associated data. The indirect indication-associated data may include a device management server-generated wireless configuration, such as a device management server-generated Wi-Fi configuration, a device management server-generated Bluetooth configuration, and/or another wireless communication configuration. In one example, indirect indication-associated data includes a device management server-generated Wi-Fi configuration. The device management server-generated Wi-Fi configuration may be included in the wireless configuration profile. The device management server-generated Wi-Fi configuration may include, for example, a fake and/or fictitious Wi-Fi configuration including a fictitious Wi-Fi SSID and/or other information. The Wi-Fi configuration may be fictitious in that it does not correspond to an existing Wi-Fi network.

A configuration profile including at least the wireless configuration profile is generated (720). In various embodiments, a wireless configuration profile is merged with one or more other profiles to generate a configuration profile (e.g., an MDM configuration profile).

The configuration profile is provided (730) to the platform management agent. In various embodiments, the configuration profile is provided to the platform management agent as part of a registration operation (e.g., as discussed in FIG. 1) and/or other operation as discussed herein.

In various embodiments, the platform management agent may be configured to use the wireless configuration information in the wireless configuration profile to configure the wireless communication settings of the mobile device. The platform management agent may, for example, add wireless networks included in the wireless configuration profile to a list of device trusted networks. In one example, a platform management agent may add a device management server-generated fictitious Wi-Fi configuration included in the wireless configuration information to a set of device-trusted Wi-Fi connections. Once configured, a set of trusted Wi-Fi connections may include the device management server-generated fictitious Wi-Fi network included in the wireless configuration profile.

Figure 8:
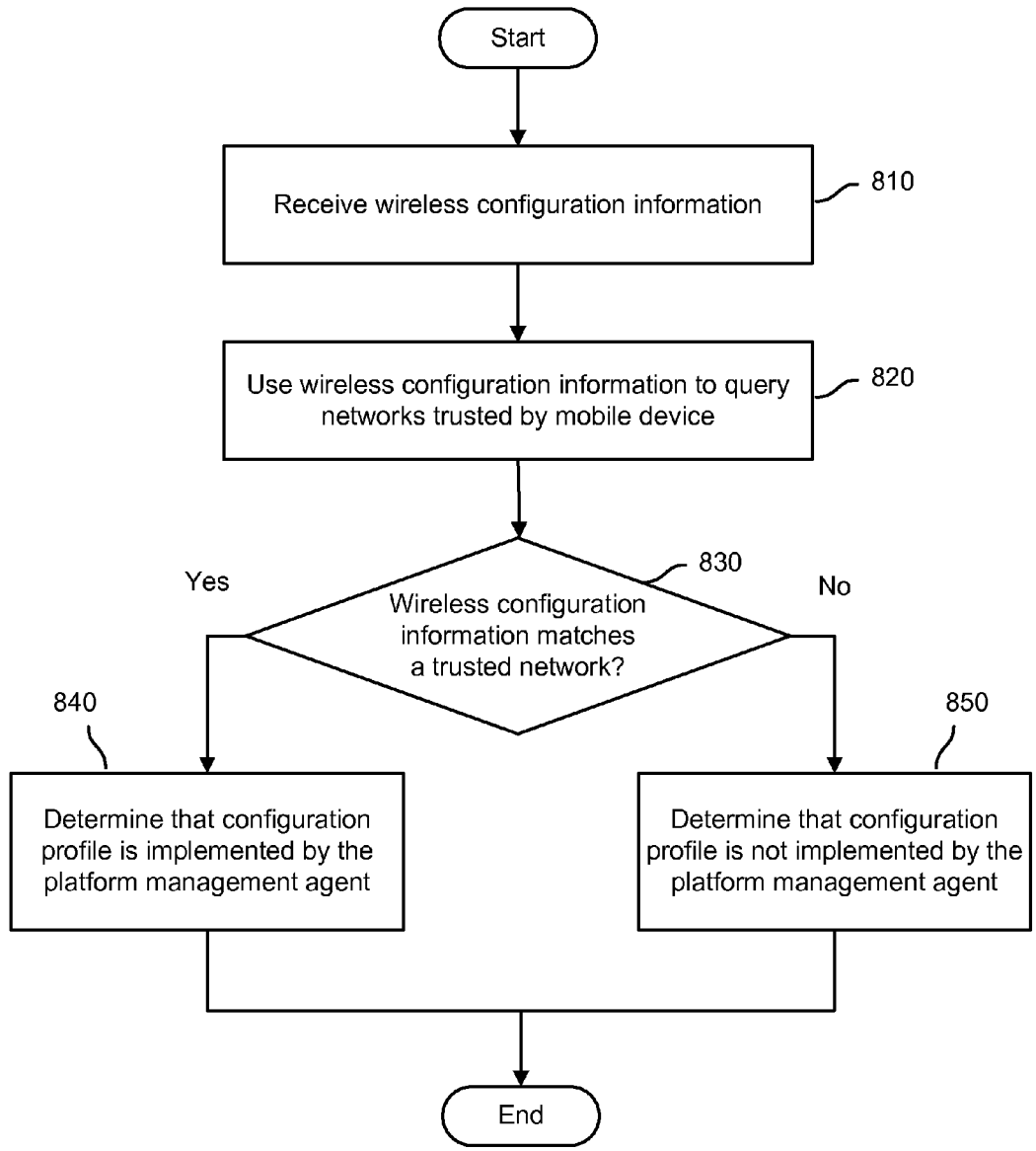
FIG. 8 is a flowchart illustrating embodiments of a process to determine that a configuration profile is implemented by a platform management agent.

FIG. 8 is a flowchart illustrating embodiments of a process to determine that a configuration profile is implemented by a platform management agent. In various embodiments, the process of FIG. 8 is implemented on a mobile device, such as mobile device 102 of FIG. 1. In the example shown, wireless configuration information is received (810). In some embodiments, the third party management agent receives wireless configuration information from the device management server. In certain cases, the wireless configuration information may include a device management server-generated Wi-Fi configuration that is also included in the wireless configuration profile provisioned to the platform management agent.

The wireless configuration information is used (820) to query one or more networks trusted by the mobile device. It is determined (830) whether the wireless configuration information matches a device-trusted network. In the event the wireless configuration information matches a trusted network, the process proceeds to step 840. If the wireless configuration information does not match a trusted network, the process proceeds to step 850.

In various embodiments, the third party management agent uses the wireless configuration information to query a set of device-trusted networks. Continuing with the example, the third party management agent uses the device management server-generated Wi-Fi configuration received from the device management server to query a set of device-trusted Wi-Fi networks to determine whether the device management server-generated Wi-Fi configuration matches a trusted Wi-Fi network. In the event the device management server-generated Wi-Fi configuration is included in the list, the process proceeds to step 840. In the event the device management server-generated Wi-Fi configuration is not included in the set of trusted networks, the process proceeds to step 850.

It is determined (840) that a configuration profile is implemented by the platform management agent. In various embodiments, an indication that a device management server-generated wireless configuration received at the third party management agent matches a device trusted wireless network may indicate the wireless configuration profile also including the device management server-generated wireless configuration is present on the device. For example, the presence of the device management server-generated wireless network in a list of trusted networks indicates that the platform management agent has configured the device-trusted networks using the wireless configuration profile, which includes the device management server-generated wireless network configuration information. Based on the determination that the wireless configuration profile exists on the device, it may be determined that the configuration profile, which includes the wireless configuration profile, is implemented by the platform management agent.

It is determined (850) that a configuration profile is not implemented by the platform management agent. In various embodiments, an absence of the device management server-generated wireless network (e.g., a device management server-generated Wi-Fi network) in a set of trusted wireless networks (e.g., trusted Wi-Fi networks) may indicate that the wireless configuration profile including the device management server-generated wireless network configuration is not present on the device. This determination may be based on the assumption that if the wireless configuration profile including the device management server-generated wireless network were present on the device, the platform management agent would add the device management server-generated wireless network to the set of trusted networks.

Figure 9:
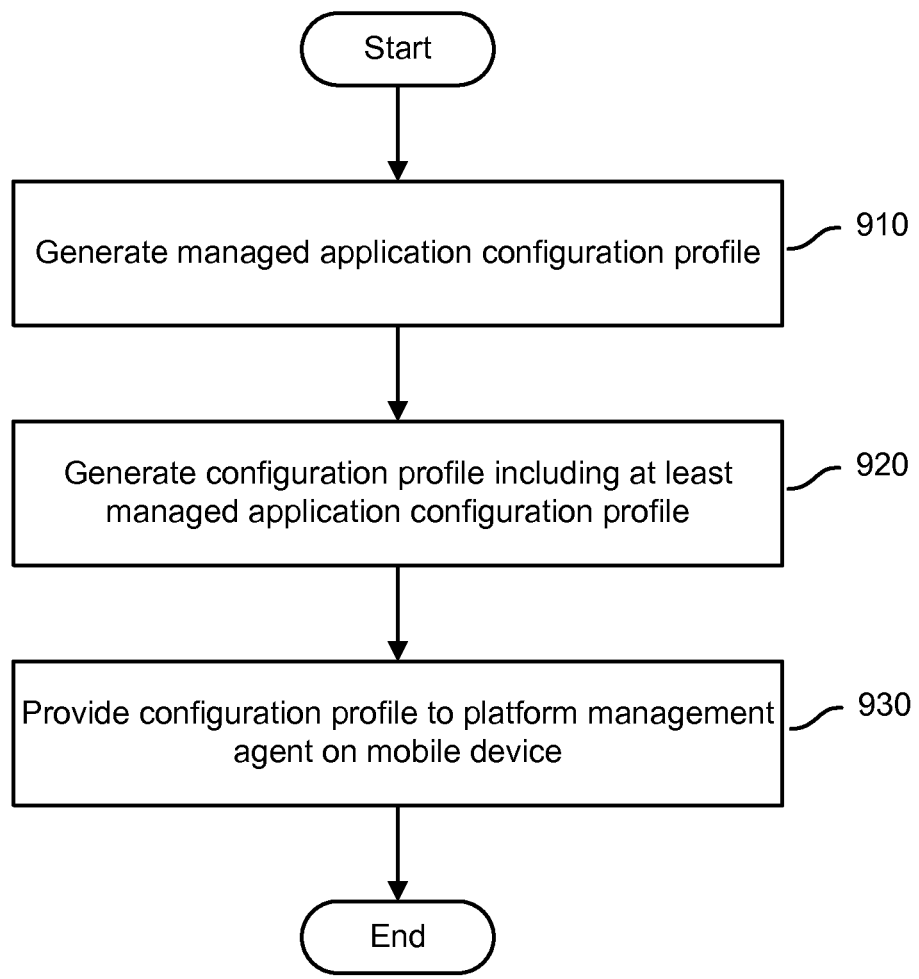
FIG. 9 is a flowchart illustrating embodiments of a process to provide a configuration profile to a platform management agent.

FIG. 9 is a flowchart illustrating embodiments of a process to provide a configuration profile to a platform management agent. In various embodiments, the process of FIG. 9 may be performed at a device management server, such as device management server 120 of FIG. 1. In the example shown, a managed application configuration profile is generated (910). In various embodiments, the device management server generates a managed application configuration profile. The managed application configuration profile may be generated to include indirect indication-associated data. The indirect indication-associated data may include, for example, a configuration parameter for a managed application, a particular setting for a managed application, and/or another configuration parameter. In one example, a configuration parameter for a managed application includes the parameter "MDM=True." In some cases, the configuration parameter may not affect the functionality of the managed application, and may just be used to detect the presence of a configuration profile on the mobile device.

A configuration profile including at least the managed application configuration profile is generated (920). In various embodiments, a managed application configuration is merged with one or more other profiles to generate a configuration profile (e.g., an MDM configuration profile).

The configuration profile is provided (930) to the platform management agent. In various embodiments, the configuration profile is provided to the platform management agent as part of a registration operation (e.g., as discussed in FIG. 1) and/or other operation as discussed herein.

In various embodiments, the platform management agent applies configuration information included in a managed application configuration profile to one or more managed applications on a device. A managed application configuration profile may include configuration parameters and/or settings for each of one or more managed applications. For example, a configuration parameter for a managed application may include the parameter "MDM=True." Upon receipt of the managed application configuration profile, the platform management agent may apply the configuration parameter ("MDM=True") and/or other parameters to the settings of a managed application.

Figure 10:
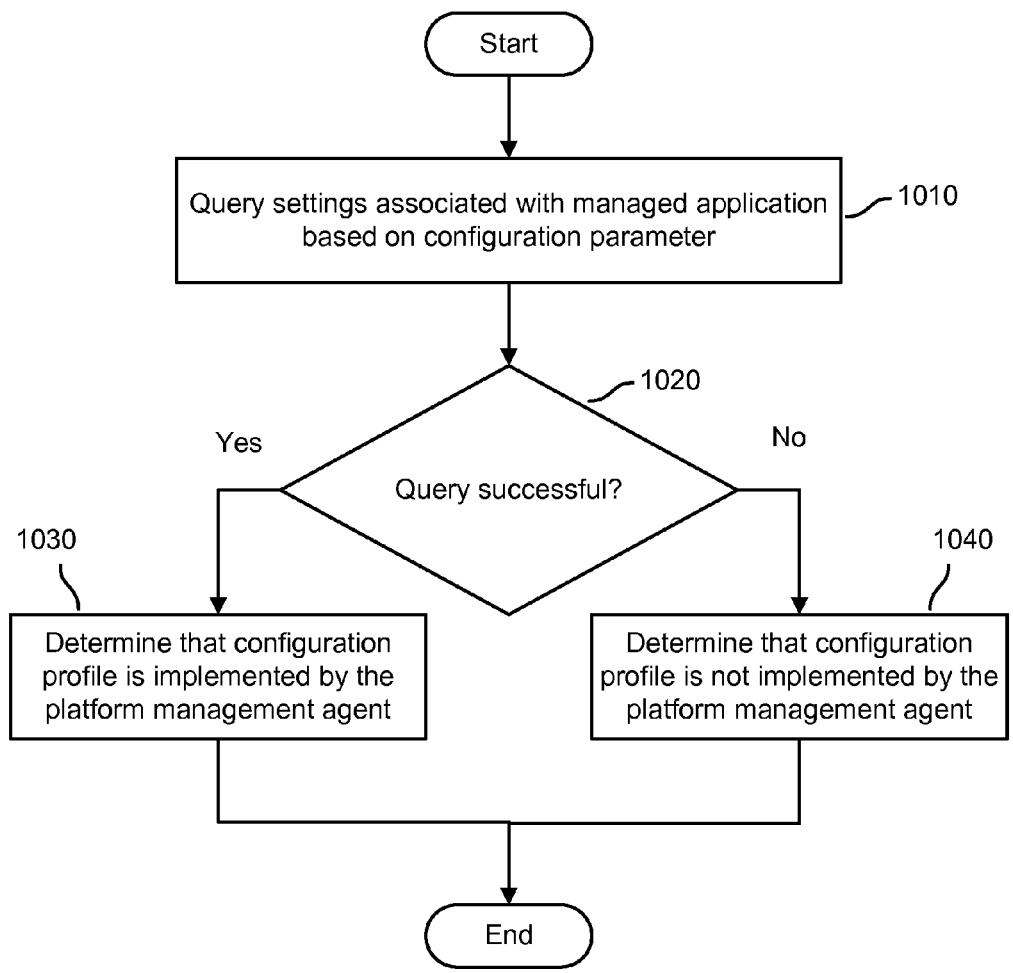
FIG. 10 is a flowchart illustrating embodiments of a process to determine that a configuration profile is implemented by a platform management agent.

FIG. 10 is a flowchart illustrating embodiments of a process to determine that a configuration profile is implemented by a platform management agent. In various embodiments, the process of FIG. 10 is implemented on a mobile device, such as mobile device 102 of FIG. 1. In the example shown, the settings associated with a managed application are queried (1010) based on a configuration parameter. In various embodiments, the third party management agent queries the settings of a managed application to determine a value of a configuration parameter. In certain cases, the device management agent may provide the third party management agent information including a configuration parameter, a managed application to which the parameter may apply, and/or other information. This configuration parameter may correspond to a configuration parameter included in a managed application configuration previously provisioned to the platform management agent. The presence of the configuration parameter in the settings for the managed application may indicate, for example, that the managed application is managed by the platform management using the managed application configuration profile.

By way of example, a managed application configuration profile provided to the platform management agent may include a configuration parameter "MDM=True" for a managed document sharing application. The device management server may provide an indication to the third party management to query for the configuration parameter "MDM=True" in the settings of the document sharing application. In response to the command/indication from the device management server, the third party management agent may query for the configuration parameter "MDM=True" in the settings of the document sharing application on the mobile device.

It is determined (1020) whether the query is successful. In the event the query is successful, the process proceeds to step 1030. In the event the query is not successful, the process proceeds to step 1040.

It is determined (1030) that the configuration profile is implemented by the platform management agent. In various embodiments, a successful query to identify the presence of a configuration parameter in the settings for a managed application may indicate that the managed application has been configured by the platform management agent according to the managed application configuration profile. For example, the native behavior of a platform management agent is to apply configuration parameters included in a managed application profile to a managed application specified in the profile. And a successful query of the settings of the specified managed application to identify the configuration parameter indicates that the platform management agent has applied the managed application configuration profile to the specified application. As discussed above, the managed application configuration profile is merged with the configuration profile provided to the platform management agent. An indication that the managed application configuration has been applied to a managed application may therefore indicate that the configuration profile is (currently) implemented by the platform management agent.

It is determined (1040) that the configuration profile is not implemented by the platform management agent. In various embodiments, the expected behavior of the platform management agent is to apply a managed application configuration profile to managed applications on the device. An unsuccessful query of the settings of a managed application to identify a configuration parameter known to be in the managed application configuration profile may indicate that the managed application configuration profile is not applied to the managed application(s) on the device. An indication that the managed application configuration profile is not and/or has not been applied to the managed applications on the device may indicate that the managed application configuration profile is not present on the device (e.g., has been removed). Based on a determination that the managed application configuration profile is not present on the device, it may be determined that a configuration profile, which includes the managed application configuration profile, is also not present on the device. Based on the determined absence of the configuration profile, it may be determined that the configuration profile is not implemented by the platform management agent.

Figure 11:
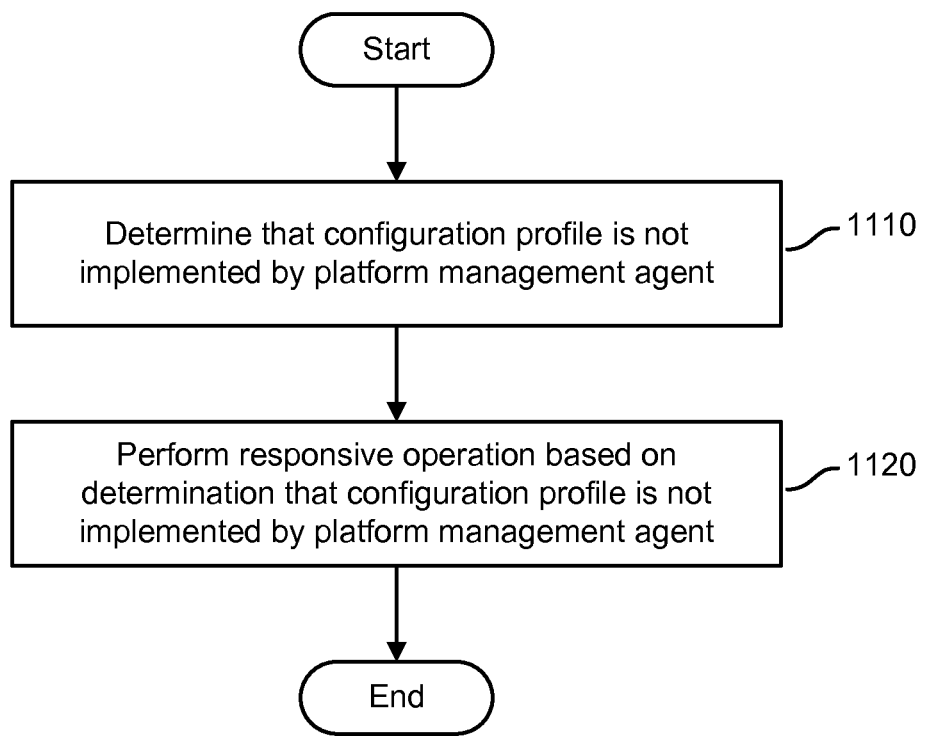
FIG. 11 is a flowchart illustrating embodiments of a process to perform responsive operations when a configuration profile is not implemented by the platform management agent.

FIG. 11 is a flowchart illustrating embodiments of a process to perform responsive operations when a configuration profile is not implemented by the platform management agent. In the example shown, it is determined (1110) that a configuration profile is not implemented by the platform management agent. Any of the techniques disclosed herein may be used to determine that a configuration profile is not implemented by the platform management agent, has been removed from a mobile device, has been deactivated, and/or is otherwise not applicable to the mobile device.

Responsive operations are performed (1120) based on the determination that the configuration profile is not implemented by the platform management agent. In some embodiments, a determination that a configuration profile is not implemented by the platform management agent and/or is not present on the device may indicate that a security configuration profile is not applicable to the device. In this case, it may be determined that the device is not secure and/or the device security cannot be validated. Based on this determination, various operations and/or actions may be performed. In one example, access to one or more applications may be blocked based, for example, on a determination that the configuration profile is not applicable to the device. In another example, one or more applications may be wiped based on a determination that the configuration profile is not applicable to the device. In a further example, one or more applications on the device may be blocked from accessing enterprise servers, services, and/or other resources. In another example, a prompt may be output to a user of the device notifying the user that the device may not be secure and/or asking the user whether they wish to use the device in an unsecure state. In a further example, the third party management agent may notify the device management server of the removal of the configuration profile. The device management server may then perform responsive operations, such as blocking the device, wiping the device, deactivating the device, alerting an administrator, and/or performing other operations.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
using a third party management agent of a mobile device to perform a test operation to determine an occurrence of an indirect indication of a presence of a configuration profile, wherein the occurrence of the indirect indication is based at least in part on a presence of indirect indication-associated data in the configuration profile, wherein using the third party management agent includes:
receiving wireless configuration information from a device management server;
using the wireless configuration information to perform the test operation including querying a set of networks trusted by the mobile device; and
determining the occurrence of the indirect indication, wherein the occurrence includes an indication that the wireless configuration information matches one or more of the set of trusted networks; and
determining, based at least in part on the occurrence of the indirect indication, that the configuration profile is implemented by a platform management agent, wherein one or more applications associated with the mobile device is prevented from accessing an enterprise server remote from the mobile device based on whether the configuration profile is implemented by the platform management agent.

2. The method of claim 1, wherein using the third party management agent includes:
receiving a certificate from the device management server;
using the certificate to generate a server on the mobile device;
performing the test operation including a platform-supported operation to authenticate to the server; and
detecting the occurrence of the indirect indication based at least in part on a successful authentication to the server.

3. The method of claim 2, wherein using the certificate to generate the server includes:
using the certificate to generate a hypertext transfer protocol secure (HTTPS) server on the mobile device.

4. The method of claim 2, wherein the performing the test operation includes performing a secure sockets layer (SSL) authentication operation to authenticate to the server.

5. The method of claim 2, wherein the certificate is associated with the indirect indication-associated data, the indirect indication data including certificate information in a certificate profile included in the configuration profile.

6. The method of claim 5, wherein the certificate information includes a certificate authority certificate that is associated with a same certificate authority as the certificate received from the device management server.

7. The method of claim 2, wherein determining that the configuration profile is implemented by the platform management agent includes:
   determining, based at least in part on the successful authentication to the server, that a certificate profile is present on the device; and
   determining, based at least in part on the presence of the certificate profile, that the platform management agent is configured based at least in part on the configuration profile.

8. The method of claim 7, wherein the certificate profile is included in the configuration profile.

9. The method of claim 2, wherein determining that the configuration profile is implemented by the platform management agent includes:
   determining, based at least in part on a certificate trust validating operation to the platform, that a certificate profile is present on the system; and
   determining, based at least in part on the presence of the certificate profile, that the platform management agent is configured based at least in part on the configuration profile.

10. The method of claim 1, wherein the wireless configuration information is associated with the indirect indication-associated data including a wireless configuration profile included in the configuration profile.

11. The method of claim 1, wherein the platform management agent is configured to perform the steps of:
    receiving a wireless configuration profile including a device management server-generated wireless network; and
    adding the device management server-generated wireless network to the set of trusted networks.

12. The method of claim 11, wherein
    the received wireless configuration information includes the device management server-generated wireless network; and
    determining the occurrence of the indirect indication includes determining that the wireless configuration information matches the device management server-generated wireless network in the set of trusted networks.

13. The method of claim 1, wherein determining that the configuration profile is implemented by the platform management agent includes:
    determining, based at least in part on the indication that the wireless configuration information matches one or more of the set of trusted networks, that a wireless configuration profile is present on the mobile device; and
    determining, based at least in part on the presence of the wireless configuration profile, that the configuration profile is implemented by the platform management agent.

14. The method of claim 13, wherein the wireless configuration profile is included in the configuration profile.

15. The method of claim 1, wherein using the third party management agent includes:
    performing the test operation including querying settings associated with a managed application based on a configuration parameter; and
    determining the occurrence of the indirect indication, wherein the occurrence includes a successful query of the managed application settings.

16. The method of claim 15, wherein determining that the configuration profile is implemented by the platform management agent includes:
    determining, based at least in part on the successful query of the managed application settings, that a managed application configuration profile is present on the mobile device; and
    determining, based at least on in part on the presence of the managed application configuration profile, that the configuration profile is implemented by the platform management agent.

17. The method of claim 16, wherein the managed application configuration profile is included in the configuration profile.

18. The method of claim 1, wherein:
    using the third party management agent includes performing the test operation, and determining, based at least in part on the performance of the test operation, that the indirect indication of the presence of the configuration profile has not occurred; and
    determining includes determining, based at least in part on the determination that the indirect indication has not occurred, that the configuration profile is not implemented by the platform management agent.

19. The method of claim 18, further comprising:
    performing an operation based at least in part on the determination that the configuration profile is not implemented by platform management agent.

20. A system, comprising:
    a processor; and
    a memory coupled with the processor, wherein the memory is configured to provide the processor with instructions which when executed cause the processor to:
    use a third party management agent of a mobile device to perform a test operation to determine an occurrence of an indirect indication of a presence of a configuration profile, wherein the occurrence of the indirect indication is based at least in part on a presence of indirect indication-associated data in the configuration profile wherein to use the third party management agent, the processor is further configured to:
       receive wireless configuration information from a device management server;
       use the wireless configuration information to perform the test operation including querying a set of networks trusted by the mobile device; and
       determine the occurrence of the indirect indication, wherein the occurrence includes an indication that the wireless configuration information matches one or more of the set of trusted networks; and
    determine, based at least in part on the occurrence of the indirect indication, that the configuration profile is implemented by a platform management agent, wherein one or more applications associated with the mobile device is prevented from accessing an enterprise server remote from the mobile device based on whether the configuration profile is implemented by the platform management agent.

21. A computer program product, the computer program product being embodied in a tangible non-transitory computer readable storage medium and comprising computer instructions for:
    using a third party management agent of a mobile device to perform a test operation to determine an occurrence of an indirect indication of a presence of a configuration profile, wherein the occurrence of the indirect indication is based at least in part on a presence of indirect indication-associated data in the configuration profile, wherein using the third party management agent includes:
- receiving wireless configuration information from a device management server;
- using the wireless configuration information to perform the test operation including querying a set of networks trusted by the mobile device; and
- determining the occurrence of the indirect indication, wherein the occurrence includes an indication that the wireless configuration information matches one or more of the set of trusted networks; and determining, based at least in part on the occurrence of the indirect indication, that the configuration profile is implemented by a platform management agent, wherein one or more applications associated with the mobile device is prevented from accessing an enterprise server remote from the mobile device based on whether the configuration profile is implemented by the platform management agent.

* * * * *

UNITED STATES PATENT AND TRADEMARK OFFICE
CERTIFICATE OF CORRECTION

PATENT NO.         : 9,762,444 B1
APPLICATION NO.    : 14/563955
DATED              : September 12, 2017
INVENTOR(S)        : Kim et al.

It is certified that error appears in the above-identified patent and that said Letters Patent is hereby corrected as shown below:

In the Claims

In Column 20, Claim 20, Line 40, after "profile", insert --,--.

Signed and Sealed this
Tenth Day of April, 2018

Andrei Iancu
*Director of the United States Patent and Trademark Office*